United States Patent
Neary et al.

(10) Patent No.: US 6,662,929 B1
(45) Date of Patent: Dec. 16, 2003

(54) PARCEL SINGULATION SOFTWARE CONTROL LOGIC

(75) Inventors: James Neary, Binghamton, NY (US); Charles Whitney, Endicott, NY (US)

(73) Assignee: Lockhead Martin Corporation, Bethesda, MD (US)

( * ) Notice: Subject to any disclaimer, the term of this patent is extended or adjusted under 35 U.S.C. 154(b) by 154 days.

(21) Appl. No.: 09/716,071

(22) Filed: Nov. 17, 2000

(51) Int. Cl.[7] .............................................. B65G 43/00
(52) U.S. Cl. ................. 198/460.1; 198/453; 198/459.1; 198/459.8; 198/461.1; 198/572; 198/575; 198/577; 198/579; 700/230
(58) Field of Search .......................... 700/230; 198/448, 198/452, 453, 459.1, 459.8, 460.1, 461.1, 461.2, 571, 572, 575, 577, 579

(56) References Cited

U.S. PATENT DOCUMENTS

| | | | |
|---|---|---|---|
| 3,583,545 A | * 6/1971 | Hovekamp | 414/795.6 |
| 3,592,326 A | 7/1971 | Zimmerle | |
| 3,613,863 A | * 10/1971 | Hedrick et al. | 198/415 |
| 3,941,372 A | 3/1976 | Matsuo | |
| 4,150,743 A | * 4/1979 | Lazzarotti et al. | 198/460.1 |
| 4,161,244 A | 7/1979 | Hunter et al. | |
| 4,360,098 A | * 11/1982 | Nordstrom | 198/418.1 |
| 4,401,301 A | 8/1983 | Hayskar | |
| 4,440,492 A | 4/1984 | Howard | |
| 4,494,646 A | * 1/1985 | Honegger | 198/461.1 |
| 4,566,595 A | 1/1986 | Fustier | |
| 4,566,685 A | 1/1986 | Irvine et al. | |
| 4,634,328 A | 1/1987 | Carrell | |
| 4,641,753 A | 2/1987 | Tamada | |
| 4,697,689 A | 10/1987 | Carrell | |
| 5,009,321 A | 4/1991 | Keough | |
| 5,031,223 A | 7/1991 | Rosenbaum et al. | |
| 5,060,785 A | 10/1991 | Garrity | |
| 5,069,440 A | 12/1991 | Lazzarotti et al. | |

(List continued on next page.)

FOREIGN PATENT DOCUMENTS

| | | |
|---|---|---|
| DE | 3826872 A1 | 3/1989 |
| EP | 0 575 109 A1 | 12/1993 |
| EP | 0 818 406 A1 | 1/1998 |
| WO | WO98/24564 A1 | 6/1998 |
| WO | WO 00/06475 | 2/2000 |

*Primary Examiner*—Khoi H. Tran
(74) *Attorney, Agent, or Firm*—Wolf, Greenfield & Sacks, P.C.

(57) ABSTRACT

A method and an apparatus are provided for singulating articles received in a slug and/or manipulating such articles to create a controlled gap between a trailing edge of a leading article and a leading edge of a successive article, while targeting a desired throughput. For singulation, a plurality of belts are mounted adjacent to each other with a slide chute between each pair of adjacent belts, articles moving from an infeed belt and passing from one belt to another through the chute therebetween. A plurality of sensors are positioned such that there is a single control sensor for at least selected ones of the belts, each control sensor sensing article position on a corresponding belt. Controls are provided for operating each belt in response to a corresponding control sensor, an operative state of a downstream belt and/or a difference between the desired throughput and detected throughput. For creating controlled gaps between successive articles, a plurality of belts are provided, mounted adjacent each other, articles being received on a first of the belts and passing from one belt to an adjacent belt. A plurality of control sensors are sensing article position relative to each belt and controls are provided which operate each belt in response to a corresponding control sensor, an operative state of a downstream belt and/or the difference between the desired throughput and the detected throughput. The controls are also operative to initiate stopping of a belt if a detected trailing-edge to leading-edge gap is smaller than the desired minimum gap.

59 Claims, 10 Drawing Sheets

U.S. PATENT DOCUMENTS

| | | |
|---|---|---|
| 5,074,539 A | 12/1991 | Wells et al. |
| 5,092,451 A | 3/1992 | Jones et al. |
| 5,133,543 A | 7/1992 | Eitel et al. |
| 5,137,139 A | 8/1992 | Ruscello |
| 5,141,097 A | 8/1992 | Oiry et al. |
| 5,165,520 A | 11/1992 | Herve et al. |
| 5,226,547 A | 7/1993 | Malatesta |
| 5,267,638 A | 12/1993 | Doane |
| 5,398,922 A | 3/1995 | Malatesta |
| 5,544,758 A | 8/1996 | Malatesta |
| 5,562,195 A | 10/1996 | Isaacs |
| 5,634,551 A | 6/1997 | Francioni et al. |
| 5,638,938 A | 6/1997 | Lazzarotti et al. |
| 5,641,052 A | 6/1997 | Lazzarotti et al. |
| 5,738,202 A | 4/1998 | Ydoate et al. |
| 5,740,901 A | 4/1998 | Lazzarotti et al. |
| 5,810,158 A * | 9/1998 | Schiesser et al. ........... 198/809 |
| 5,862,907 A | 1/1999 | Taylor |
| 5,915,523 A * | 6/1999 | Spatafora ................. 198/461.3 |
| 5,950,800 A * | 9/1999 | Terrell et al. ............... 198/448 |
| 5,984,078 A * | 11/1999 | Bonnet .................... 198/370.1 |
| 6,217,020 B1 | 4/2001 | Supron et al. |
| 6,259,967 B1 * | 7/2001 | Hartlepp et al. ............ 700/230 |
| 6,260,841 B1 | 7/2001 | Tranquilla |
| 6,270,069 B1 | 8/2001 | Cera et al. |
| 6,270,070 B1 | 8/2001 | Salomon et al. |

\* cited by examiner

| DESCRIPTION | MIN | DURATION SECONDS | | | | | | | | | | | | | | | | | MAX |
|---|---|---|---|---|---|---|---|---|---|---|---|---|---|---|---|---|---|---|---|
| | 0.5 | 1.0 | 1.5 | 2.0 | 2.5 | 3.0 | 3.5 | 4.0 | 4.5 | 5.0 | 5.5 | 6.0 | 6.5 | 7.0 | 7.5 | 8.0 | 8.5 | 9.0 |
| 89 — INFEED CHUTE 60 ON-TIME | | | | | | | | | | | | | | | | | | | |
| 99 — SURGE BELT 62a ON-TIME | 0.25 | 0.50 | 0.75 | 1.00 | 1.25 | 1.50 | 1.75 | 2.00 | 2.25 | 2.50 | 2.75 | 3.00 | 3.25 | 3.50 | 3.75 | 4.00 | 4.25 | 4.50 |
| 107 — SURGE BELT 62b ON-TIME | 0.29 | 0.31 | 0.33 | 0.35 | 0.37 | 0.39 | 0.41 | 0.43 | 0.45 | 0.47 | 0.49 | 0.51 | 0.53 | 0.55 | 0.57 | 0.59 | 0.61 | 0.63 |
| 109 — SURGE BELT 62b OFF-TIME | 0.59 | 0.57 | 0.55 | 0.53 | 0.51 | 0.49 | 0.47 | 0.45 | 0.43 | 0.41 | 0.39 | 0.37 | 0.35 | 0.33 | 0.31 | 0.29 | 0.27 | 0.25 |

PARCEL SINGULATION SOFTWARE CONTROL LOGIC

FIELD OF INVENTION

This invention relates to article handling systems, and, more particularly, to a method and apparatus for singulating articles and establishing a controlled inter-article gap.

BACKGROUND OF THE INVENTION

In mail processing, airport baggage claim service, assembly line operations and other applications involving transport and processing of various articles, it is often necessary to separate articles randomly received, sometimes enmass as a slug, stack or pile, into a stream of successive articles. This process of separating articles is generally referred to as "singulation". In a post office or delivery service, for example, packages may arrive at a conveyor system in randomly occurring slugs, the packages in each slug varying significantly in quantity, size and shape within allowed ranges. Singulating such packages or other articles is an essential preliminary step in performing sortation or most other operations on such articles. For the articles to be sorted or otherwise processed, they also must, in most cases, be separated by a gap of sufficient length. However, while at least a minimum gap between succeeding articles is required, spacing larger than the required minimum gap decreases throughput.

Automation apparatus is normally employed for article singulation and establishing proper article separations, such prior art apparatus using belt and chute systems, cameras and/or arrays of photo sensors for each belt to determine positioning of articles on the belts, and mechanisms ranging from robotic arms, to mechanical guides, to complicated control logic for slowing down and speeding up the belts in order to separate the articles to achieve singulation. Gapping apparatus involve various sensors for determining existing leading-edge to leading-edge or trailing-edge to leading-edge distance; gaps are adjusted to desired sizes via mechanical means.

While, combined, a singulation and a gapping apparatus would accomplish the task of singulating and gapping articles, such apparatus has heretofore been expensive and hard to operate, requiring the use of sophisticated technology. There exists a need for an apparatus that is capable of achieving either one or both goals without the use of cameras, computers to analyze digital images, or other expensive equipment.

SUMMARY OF THE INVENTION

In accordance with the above, this invention provides a method and an apparatus for singulating articles received in a slug and/or manipulating such articles, particularly articles of various size, to create a controlled gap between the trailing-edge of a leading article and a leading-edge of a successive article; For singulation, a plurality of belts are provided, mounted adjacent to each other, with a slide chute between each pair of adjacent belts, articles being received on a first of the belts and passing from one belt to an adjacent belt through the chute therebetween. A plurality of sensors are positioned such that there is a single control sensor for at least selected ones of the belts, each control sensor sensing article position relative to a corresponding belt. Controls are provided for operating each belt in response to a corresponding control sensor and an operative state of a downstream belt.

The control sensor may be located at an end of a corresponding belt, for example, the exit end of the corresponding belt. The controls may be operative to initiate stopping of a belt if a downstream belt is not running and a corresponding control sensor has been blocked for a configurable period of time. Similarly, the controls are operative to start or re-start a belt when the downstream belt is running. For preferred embodiments, the configurable time period is such that the belt has not completely stopped when a run signal is sent The configurable time period may also be adjustable to achieve a desired apparatus throughput, such adjustment, for example, being according to an adjustment schedule. The controls may, for example, include at least one subroutine for each belt which run on an appropriate processor.

The invention also includes apparatus for receiving articles in a stream and creating a controlled gap between a trailing-edge of a leading article and a leading-edge of a successive article. This apparatus includes a plurality of belts mounted adjacent each other, articles being received on a first of the belts and passing from one belt to an adjacent belt. A plurality of control sensors are positioned such that there is a single control sensor sensing article position relative to each belt and controls are provided which operate each belt in response to a corresponding control sensor and an operative state of a downstream belt. The control sensor may be located at an end of a corresponding belt, for example, the exit end of such belt.

The plurality of belts may be logically divided into a first section which minimizes a gap time and a second section which establishes at least a minimum gap time between successive articles. The controls are operative to initiate stopping of a belt in the first section if a downstream belt is not running and a corresponding control sensor is blocked and to send a run signal when the downstream belt is running again. The controls are also operative to initiate stopping of a belt in the second section if a detected trailing-edge to leading-edge gap time is smaller than the desired minimum gap time, and a run signal is sent to the belt after a calculated time period, the calculated time period being a function of a difference between the detected gap time and the minimum gap time. More specifically, calculation of the above function includes: (a) setting the calculated time period to be equal to the difference between the detected gap time and the minimum gap time if the difference is larger thin a determined fraction of the minimum gap time; and (b) setting the calculated time period to be equal to a fraction of the minimum gap time if the difference between the detected gap time and the minimum gap time is smaller or equal to a determined fraction of the minimum gap time.

The controls are also operative to initiate stopping of a belt, or at least a subset of the plurality of belts, if Corresponding control sensor has been Socked for more than a predetermined time period, which time period may be adjusted to target the desired throughput. For some embodiments, the predetermined time period is smaller than, or at most equal to a time it would take for a longest article to move past the corresponding control sensor. The controls preferably consist of at least one subroutine for each belt.

The invention farther includes a method usable with an apparatus for manipulating articles of various size which includes stages of belts carrying the articles and belt controls for stopping and starting the belts, the method maintaining a desired article throughput and including the steps of: (a) monitoring throughput for the article manipulation; and (b) controlling stop time intervals for at least selected ones of the belts to maintain the desired throughput. The step of controlling stop time intervals, step (b) above, may include:

(c) adjusting at least selected stop time intervals upward by a selected amount if current throughput is greater than the desired throughput; and (d) adjusting at least selected stop time intervals downward by selected amounts if current throughput is less than the desired throughput. The stop time intervals in steps (c) and (d) above may be adjusted according to at least one adjustment schedule which adjustment schedule is stored in a computer on which control subroutines are run.

The invention further includes apparatus for manipulating articles while maintaining a desired throughput, which apparatus includes stages of belts carrying the articles, and controls operating each belt, the controls being operative to stop and start the belts, and including subroutines for monitoring throughput for the article manipulation and for controlling stop time intervals for at least selected ones of the belts to maintain the desired throughput. The subroutines for controlling stop time intervals may include (a) a subroutine for adjusting at least selected intervals upward by a selected amount if current throughput is larger than the desired throughput; and (b) a subroutine for adjusting at least selected intervals downward by a selected amount if current throughput is smaller than the desired throughput. The adjustments by subroutines (a) and (b) above may be according to an adjustment schedule.

The foregoing and other objects, features and advantages of the invention will be apparent from the following more particular description of a preferred embodiment of the invention as illustrated in the accompanying drawings, the same reference numerals being used for common elements in the various figures.

Finally, the invention includes apparatus for receiving articles in a slug, singulating the articles and creating a controlled gap between a trailing-edge of a leading article and a leading-edge of a successive article. This apparatus includes a plurality of belts mounted adjacent each other, articles being received on a first of the belts and passing from one belt to an adjacent belt. A plurality of control sensors are positioned such that there is a single control sensor sensing article position relative to each belt and controls are provided which operate each belt in response to a corresponding sensor and an operative state of a downstream belt.

DETAILED DESCRIPTION OF THE PREFERRED EMBODIMENT

Figure 1:
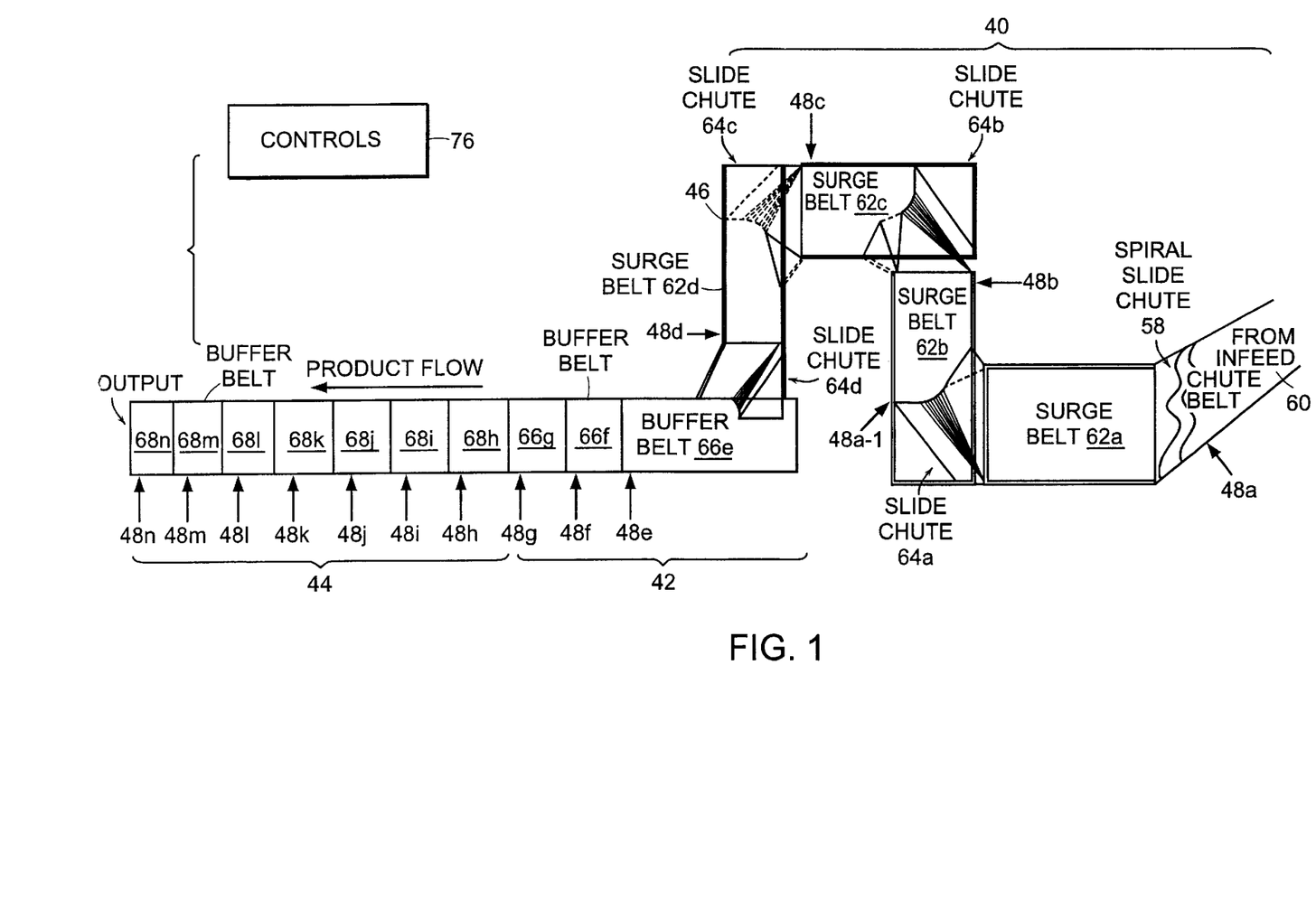
FIG. 1 is a diagramatic top view of a combined singulation and gapping system for an illustrative embodiment.

Referring to FIG. 1, an illustrative apparatus in accordance with the teachings of this invention is shown for randomly receiving articles of variable size within selected limits in slugs having varying numbers of articles with varying orientations and for delivering the articles one at a time with a controlled trailing-edge to leading-edge spacing between successive articles. Articles arrive and are singulated in section 40, proceed to section 42 where any remaining doubles are eliminated and large gaps between articles are reduced; and then proceed to section 44 where at least a minimum trailing-edge to leading-edge spacing between successive articles is established. Sections 42 and 44 together comprise a gapping section and may also be referred to as a gapping apparatus. From there, articles proceed to a sortation or other appropriate stations for further manipulation or processing.

For the illustrative embodiment, articles arrive at singulation section 40 from an infeed chute belt 60 through a large spiral slide chute 58. The singulation section is comprised of multiple belts 62a through 62d, which are collectively referred to as surge belts 62 because they carry forward some unsingulated slugs. Surge belts 62 are interconnected by slide chutes 64a–64d, with slide chute 64d leading to section 42. Sensors 48a–48d are positioned so that there is at least one sensor 48x per each surge belt 62x. Articles proceed from the infeed chute belt 60 onto the spiral slide chute 58, where they are sensed by photosensor 48a, onto a surge belt 62a, then through slide chute 64a, and to a surge belt 62b, and so on: from a surge belt 62x to a slide chute 64x to a downstream surge belt 62(x+1). Sensors 48x are typically located at the ends of the corresponding surge belts 62x. They are preferably placed at the belt elevation, looking across the belt. There is belt guarding (not shown) on each side of each surge belt 62x in order to prevent articles from falling off, holes being formed in each guarding where sensors 48 are located. Sensors 48 are each located within one quarter inch from a top of the corresponding belt 62 because, in the environment of the illustrative embodiment, articles may be as small as half an inch in one dimension—for example, music CDs, etc. Placing sensors 48x at the ends of the corresponding belts 62x means that they detect the articles as the articles are about to move off to the corresponding slide chute 64x, which, combined with proper control settings, assists singulation while minimizing possible gaps without closing them completely. Each belt is run by a motor controlled by control logic. For the illustrative embodiment, surge belts 62 are located at ninety degree angles to each other, and slide chutes 64 separating them each have a different angle and slope, with each successive slide chute 64 being narrower than the previous one. In addition, surge belts 62 are inclined up, with slopes ranging approximately from thirty to forty degrees, while the slide chutes are angled down at angles which may be steeper, but extend for a shorter distance. These inclines are not required, but further assist singulation. Surge belts 62 are wider and longer than belts at later stages, but each belt 62x is narrower than the preceding belt 62(x−1), so that articles are forced into a stream.

Infeed chute belt 60 and each of the surge belts is controlled by controls operating each belt 62x in response to a corresponding sensor 48x and/or an operative state for a downstream surge belt. In a preferred embodiment, the surge belts 62 run at different speeds —each belt is faster than the belt preceding it, which further assists singulation because faster downstream belts carry articles away and prevent clump creation. The controls can turn each surge belt 62 on or off, depending on its current state, the state of at least one downstream belt, whether the corresponding sensor is sensing any articles, and the throughput of the whole apparatus. That is, the articles are singulated through selective, coordinated control of the on and off states for the belts. The infeed chute belt 60 is operated by a control subroutine shown in FIG. 2. The surge belt 62*a* is operated by a control subroutine shown in FIG. 3, and the remaining surge belts 62*b*–62*d* are operated by the control subroutines shown in FIG. 4.

Section 42 consists of a set of belts 66*e*–66*g*, which are collectively referred to as buffer belts 66 because they carry mostly singulated articles. Buffer belts 66 run at a faster speed than surge belts 62 in singulation section 40 and function as high speed takeaway belts. For an illustrative embodiment, belts 62 run at about 50–150 feet per minute, while belts 66*e*–66*g* run anywhere from 250 to 350 feet per minute. Each buffer belt 66 runs at a higher speed than the belt preceding it.

An article arrives at section 42 from section 40 at a buffer belt 66*e* and leaves photosensor 48*e*–48*g* sensing articles at that belt. Each buffer belt 66 is operated by controls 76 according to a control flow diagram (see FIG. 5), buffer belt 66*x* being turned on or off in response to its current state, a corresponding sensor 48*x*, the on/off state of at least one downstream belt, for example belt 66(x+1) and, for a preferred embodiment, the throughput of the entire apparatus shown in FIG. 1.

Gapping section 44 consists of a set of belts 68*h*–68*n*, which are buffer belts for an illustrative embodiment and are collectively referred to as buffer belts 68. Buffer belts 68 run incrementally faster than each other, with speeds ranging from 200 to 500 feet per minute. Buffer belt 68*h* runs slower than the buffer belt 66*g*. Above each belt 68*x* there is a corresponding photosensor 48*x*. Gapping is achieved through controls turning each buffer belt 68*x* on or off according to a control subroutine (FIG. 6), each buffer belt 68*x* being turned on/off in response to a corresponding sensor 48*x* and/or the state of at least one downstream belt, for example belt 68(x+1). Articles arrive at the gapping section 44 from section 42 at the buffer belt 68*h* and leave the apparatus at a buffer belt 68*x*, for example buffer belt 68*n* for the embodiment of FIG. 1, from where they proceed to their next destination, for example a sortation station.

Additional fail-safes are available in the apparatus. Above surge belts 62, buffer belts 66 and buffer belts 68, additional photosensors 46 are located (shown for the surge belt 62*d*; not shown, but present above other belts 62, 66 and 68). These photosensors are generally for detection of jams that cannot be solved through cycling belts on and off and require human intervention. When articles exit at buffer belt 68*n*, any remaining doubled articles, which should be minimal, if any, are detected and re-routed back to the infeed chute 60 through a return path (not shown), so that they will go through the singulation process again. Belt controls 76 are implemented using a control computer capable of concurrently executing several subroutines, inputs to which are the states of sensors and belts, as described below, and outputs from which control motors (not shown) for each of the belts in the apparatus. The subroutines may be implemented in any computer language, and may consist of additional subroutines.

Although the preferred embodiment uses a single computer to execute all subroutines that comprise controls 76 in parallel, alternative embodiments may use a separate computer for each set of subroutines or bypass software and implement the subroutines in hardware or hybrid circuits. A number of the subroutines at some point refer to a configurable time period, which is a variable setting, configured according to a table in FIG. 10. An additional feedback loop (not shown) continuously monitors the apparatus output through a throughput-monitoring subroutine and, based upon a target throughput, adjusts variable time parameters to speed up or slow down the apparatus through changing the configurable time periods.

Figure 2:
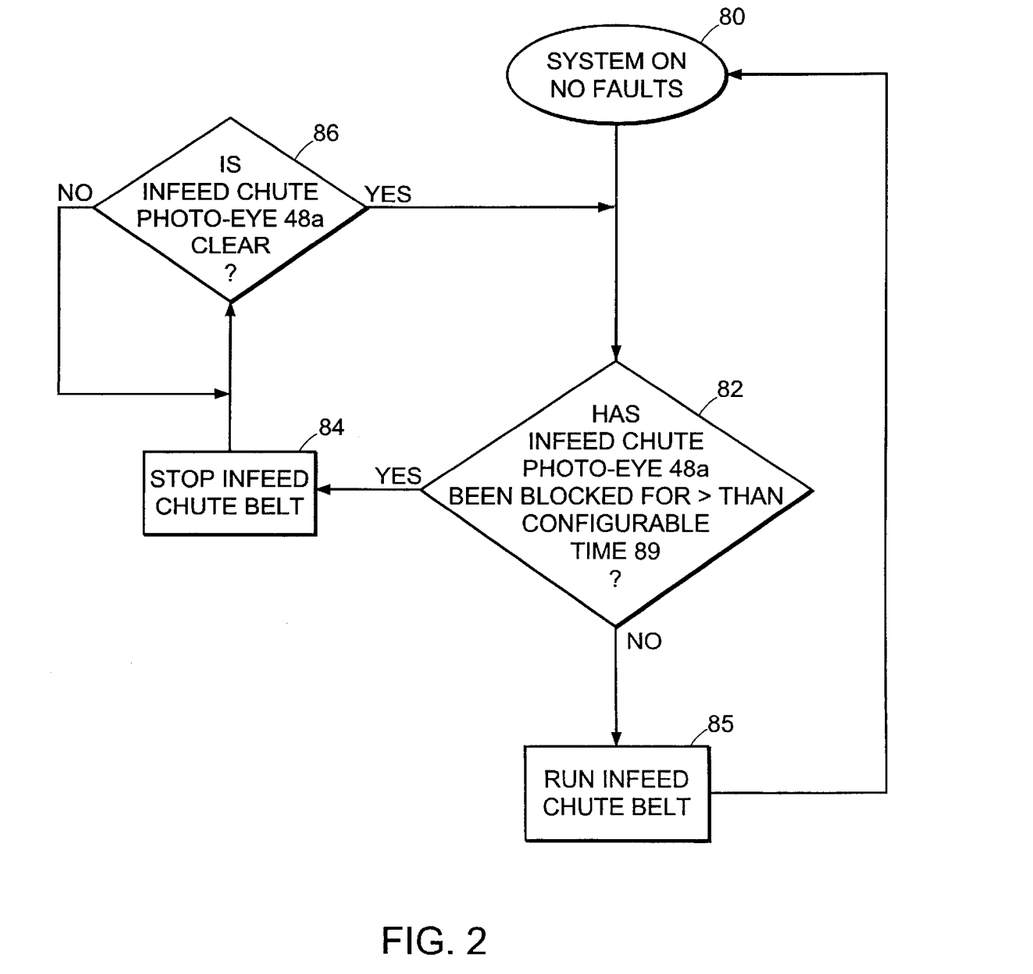
FIG. 2 is a control flow diagram for the infeed chute belt of the FIG. 1 embodiment.
Figure 10:
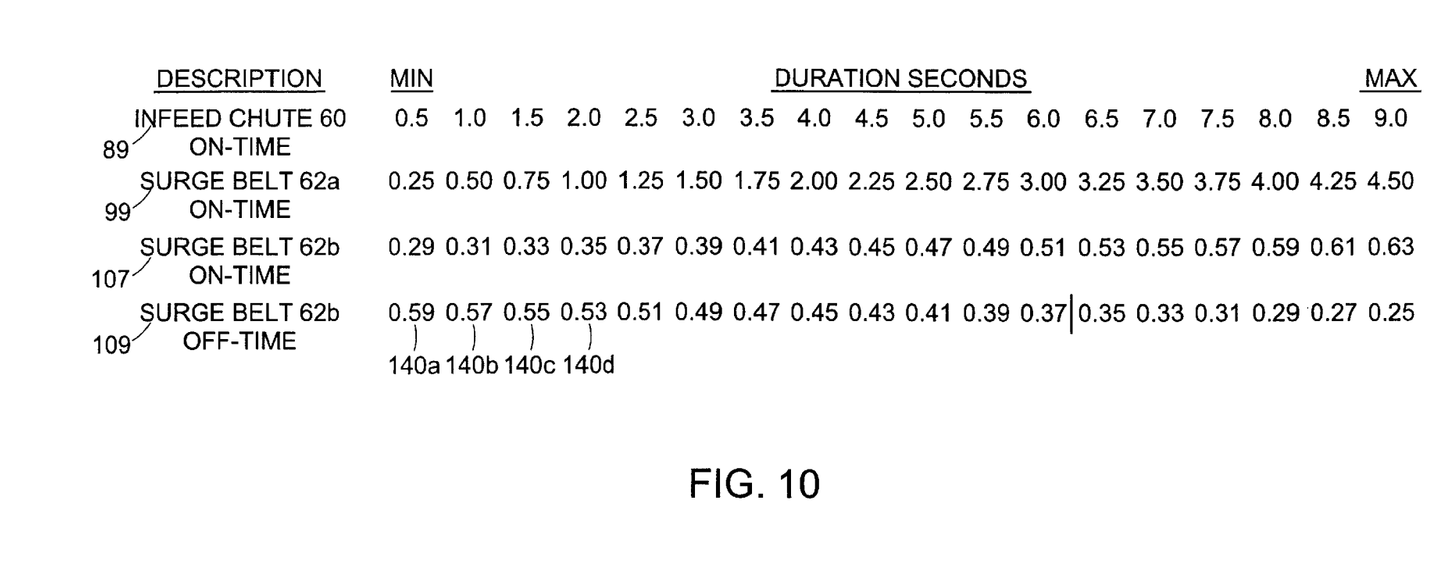
FIG. 10 is a timing schedule for changing configurable time periods.

FIG. 2 is a flow diagram of an illustrative control subroutine for operating the infeed chute belt 60 (FIG. 1) A default state for this subroutine is state-80, system on, no faults, where the infeed belt is turned on and is running. When the system is in this state, the subroutine monitors a photosensor 48*a* and continuously runs a query 82 to see if the photosensor 48*a* has been blocked for more than a configurable time period 89 (FIG. 10). If an answer to this query is negative, the system proceeds as previously, running the belt in step 85 and returning to state 80. If, however, photosensor 48*a* has been blocked for a time greater than the configurable time 89, it means that several articles are passing together, which is undesirable. In that case, the motor for the infeed belt is turned off (step 84) to delay trailing articles, which are still on the infeed chute belt 60 and to allow articles which are already on the surge belt 62*a* to proceed. When the infeed chute belt is stopped, a query 86 is continuously run to check if the photosensor 48*a* is still blocked (i.e. if articles blocking the sensor have cleared). If the sensor is clear, the subroutine returns to query 82 to determine whether to restart the infeed chute belt 60. In this way, the control subroutine begins singulation by separating the slug of articles into separate articles or small clumps of articles. The singulation process continues with control subroutines shown in FIGS. 3 and 4.

Figure 3:
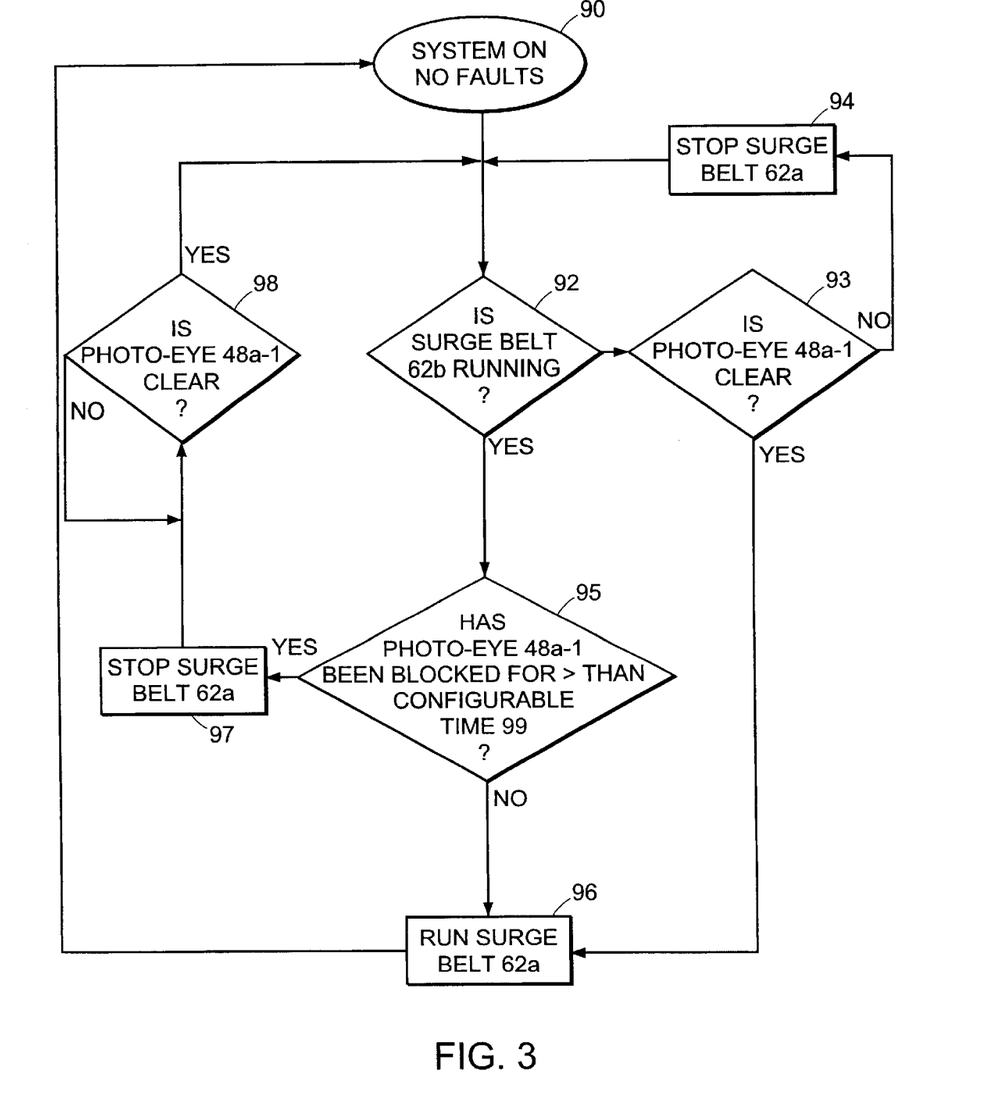
FIG. 3 is a control flow diagram for the first belt of the singulator section of the FIG. 1 embodiment.

FIG. 3 is a flow diagram of a control subroutine for the surge belt 62*a*. A default state for this subroutine is state 90—system on, no faults, where the surge belt 62*a* is running. While the system is in this state, a query 92 is continuously run to check if the downstream belt—surge belt 62*b*—is turned on. If the downstream belt is stopped, a query 93 is run to check if a photosensor 48(a–1) is indicating an article at the beginning of the surge belt 62*b*. If the photosensor 48(a–1) is indicating an article and the downstream belt is not running, surge belt 62*a* needs to be stopped (step 94) in order to avoid creating more doubles by bumping articles that are currently on the surge belt 62*a* into those that are currently on the surge belt 62*b*. If, however, there are no articles at the beginning of the downstream belt, then it is safe to continue running surge belt 62*a* (step 96) and system returns to the default state 90.

If the query 92 indicates that downstream belt 62*b* is running, a query 95 is run to check if the photosensor 48(a–1) has been blocked for a period longer than a configurable time period 99 (FIG. 10). If the answer is negative, belt 62*a* continues to run (step 96) and system returns to default state 90. A positive answer to query 95 is a sign that an article double is coming through which needs to be singulated. In order to achieve singulation, surge belt 62*a* is stopped (step 97) to allow surge belt 62*b* to take away a front article of the double. Once the surge belt 62*a* is stopped, a query 98 is continuously run to check if the photosensor 48(a–1) has cleared. When photosensor 48(a–1) indicates that there are no articles present at the beginning of bolt 62*b*, the system proceeds to run query 92 and repeats the steps thereafter as indicated above. This subroutine thus creates gaps between at least some consecutive articles by not running the belt 62a when photosensor 48(a−1) indicates that there are articles at the beginning of the downstream belt, but running belt 62a when this condition does not exist. This subroutine does not attempt to properly size or minimize such gaps, leaving that for the later stages 42 and 44.

Figure 4:
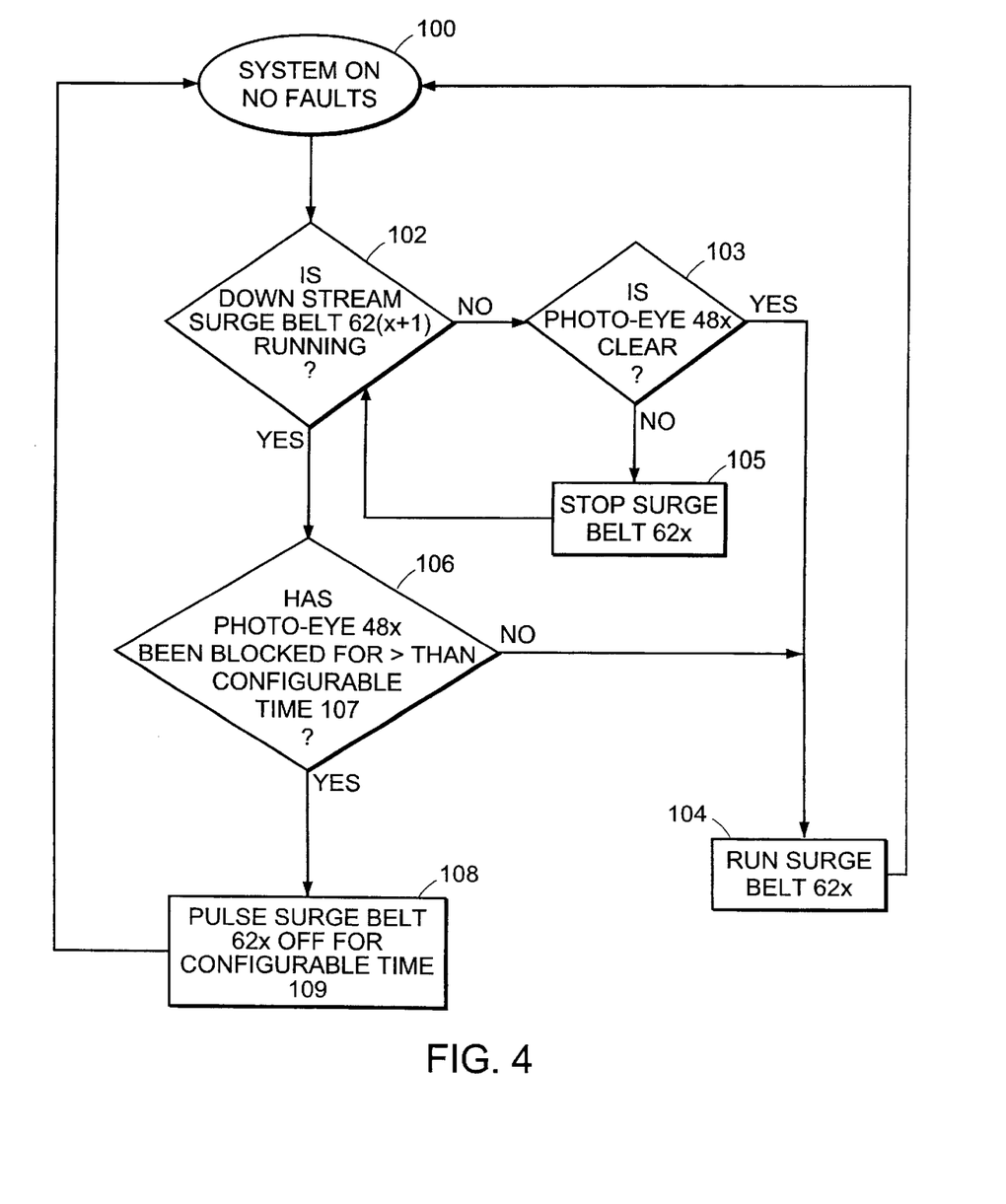
FIG. 4 is a control flow diagram for the remaining belts of a singulator section of the FIG. 1 embodiment.

FIG. 4 is a flow diagram of a control subroutine for operating belts 62b, 62c and 62d.

For each of those surge belts, referred to as surge belt 62x, a separate instance of the subroutine is run. A default state for this subroutine is state 100, where surge belt 62x is running and there are no faults. When the system is in state 100, a query 102 is continuously run to check if downstream surge belt 62(x+1) is running. If the answer query 102 is negative the downstream belt is not running a query 103 is run to check if a photosensor 48x is indicating presence of an article. If no article is detected, the subrouting continues running belt 62x (step 104) and returns to the default state 100. If, however, an article is detected, belt 62x is stopped (step 105) to avoid creating new doubles, and the subroutine returns to query 102. If the answer to query 102 is positive (i.e. the downstream belt is running), a query 106 is run to check whether the photosensor 48x has been blocked for a period of time longer than a configurable time period 107 (FIG. 10). A positive answer to the query 106 indicates that there is still an article double, and surge belt 62x is turned off for a configurable time period 109(FIG. 10) to facilitate separation of the double, and then turned back on, with the system returning to default state 100. The fact that the downstream belt 62x is running is sufficient to assure that a gap is created during the stopping for the configurable time period 109. A negative answer to the query 106 indicates that there is no double currently passing through belt 62x, surge belt 62x thus continuing to run (step 104) and the subroutine returning to default state 100.

Figure 5:
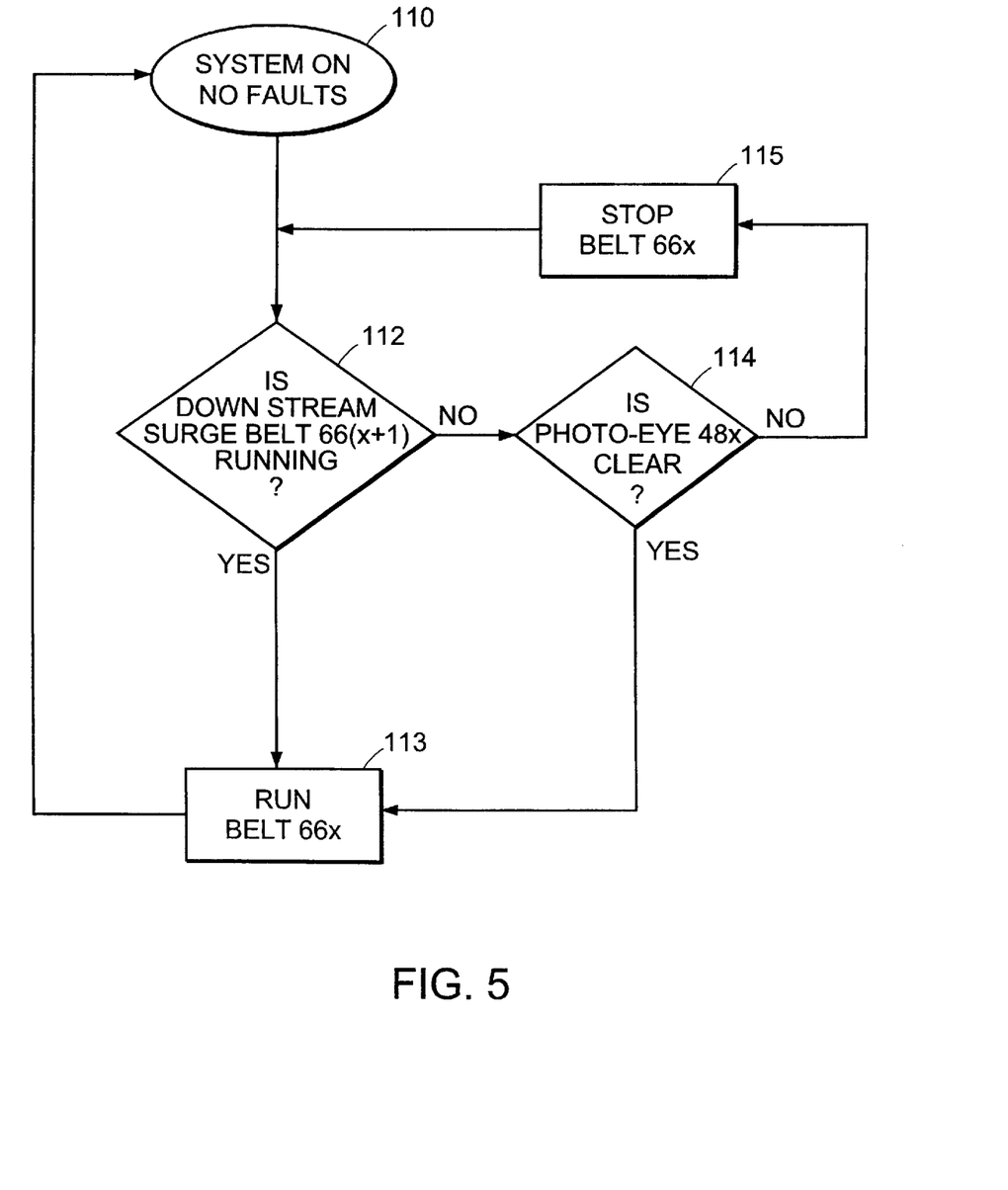
FIG. 5 is a control flow diagram for the first three belts of a gapping section of the FIG. 1 embodiment.

FIG. 5 is a diagram of control subroutine for controlling each of the buffer belts 66e–66g in the section 42. Belts 66x arc high speed takeaway belts and the main goal for this section is to minimize gaps between the articles, so that the next section 44 can increase them to the desired minimum size. For each of the buffer belts 66x, a separate instance of the subroutine is run. A default state for this subroutine is state 110—system on, no faults—where a belt 66x is running. When the subroutine is in this state, a query 112 is continuously run to check if the downstream belt 66(x+1) is running. If the downstream belt is running, there is no danger of creating additional doubles; the subroutine therefore permits belt 66x to continue running (step 113) and returns to default state 110.

If the downstream belt is not running, a query 114 is run to check if photosensor 48x is indicating the presence of an article at the end of the belt 66x. If there is an article, buffer belt 66x is stopped (step 115) and the subroutine returns to query 112. If there is no article present, the subroutine continues to run buffer belt 66x (step 113), returning to the default state 110 despite the fact that downstream belt 66(x+1) is not running. This is done in order to minimize the gap between the articles; no additional doubles will be created, because, by the time the next article moves to the end of buffer belt 66x, either the downstream belt will be running, or both queries 112 and 114 will return negative results and belt 66x will be stopped, avoiding combining two articles into a double.

Figure 6:
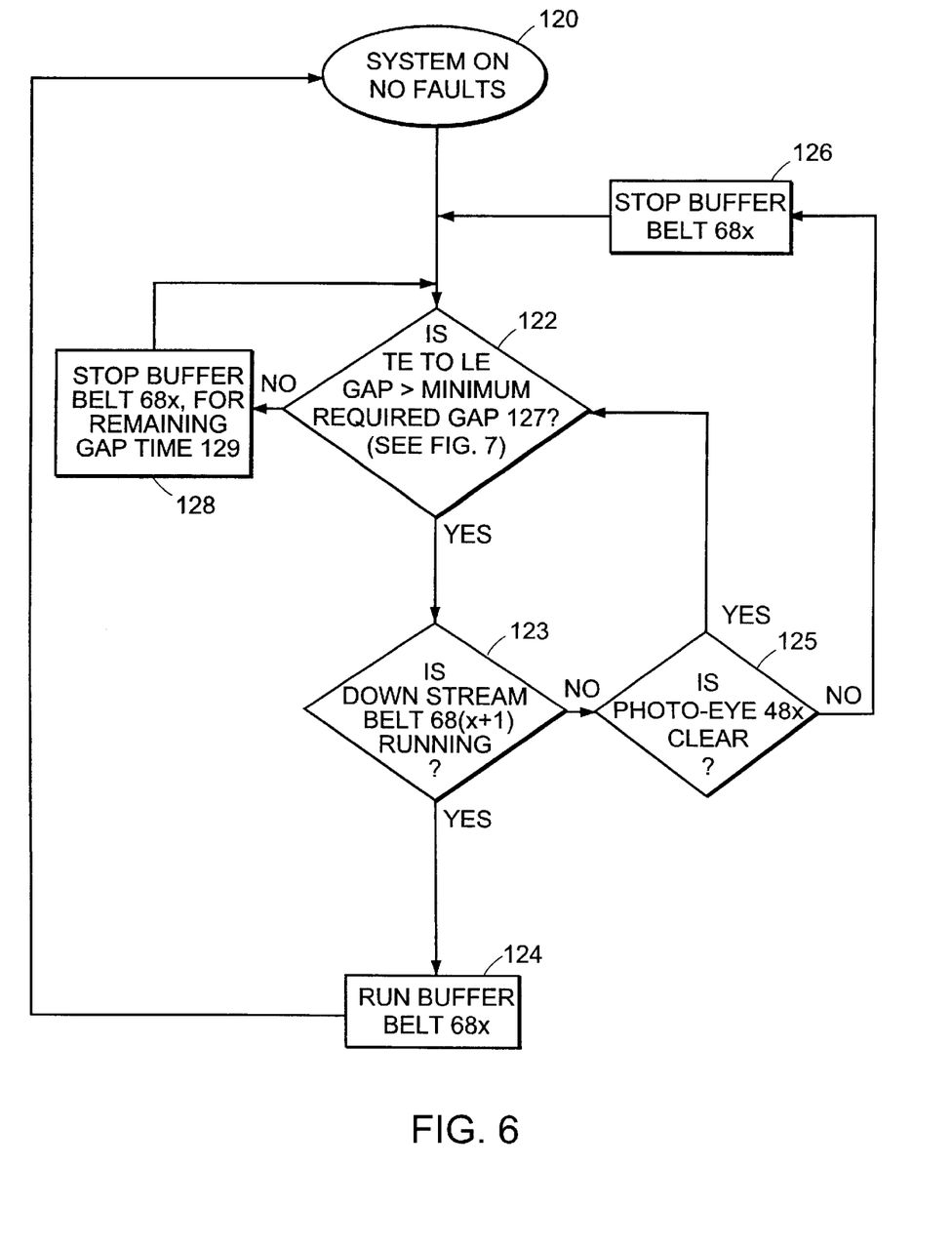
FIG. 6 is a control flow diagram for the remaining belts of the gapping section of the FIG. 1 embodiment.

FIG. 6 is a flow diagram of a control subroutine responsible for operation of belts 68 in the section 44. The main goal for this section is to establish at least a minimum required gap between each pair of successive articles. In order to do that, gap time is increased to at least minimum gap time in all cases where a detected gap is not long enough. A separate instance of the subroutine is run for each buffer belt 68x. A default state for this subroutine is state 120—system on, no faults, where belt 68x is running. When the subroutine is in that state, a query 122 is continuously run to check if the trailing-edge to leading-edge gap for successive articles passing sensor 48x is larger than a required minimum gap 127 (see FIG. 7a). The check is made according to the timing principles described later in conjunction with FIGS. 7–9. A negative answer to query 122 indicates that the detected gap is not of sufficient duration, and buffer belt 68x is stopped for a time period 129 described to be in conjunction with FIGS. 7–9 (step 128). After the belt has been stopped for the time period 129, the subroutine returns to query 122. However, if during the time period 129 when buffer belt 68x was stopped, downstream buffer belt 68(x+1) was also not running, the detected gap was not increased or increased by an insufficient amount. The illustrative apparatus includes seven buffer belts 68 running at different speeds, which increases the probability that, if the detected gap is not sufficient, the downstream belt 68(x+1) will be running during the whole time period 129, thus creating at least the minimum required gap.

A positive answer to query 122 indicates that the detected gap is of sufficient duration. Query 123 is then made to determine if downstream belt 68(x+1) is running. If an answer is positive, there is no danger of decreasing the detected gap, and the subroutine proceeds to run belt 68x (step 124), returning to default state 120. If, however, the downstream belt is not running, a query 125 is run to determine if photosensor 48x indicates the presence of an article at the end of belt 68x. If there is no article present, the subroutine continues running buffer belt 68x and returns to query 122, which monitors the detected gap. If photosensor 48x is not clear—the article is present—the subroutine sends a stop signal to a motor for belt 68x (step 126) and returns to query 122, which ensures that the detected gap is not reduced below the minimum required gap.

Figure 7A:
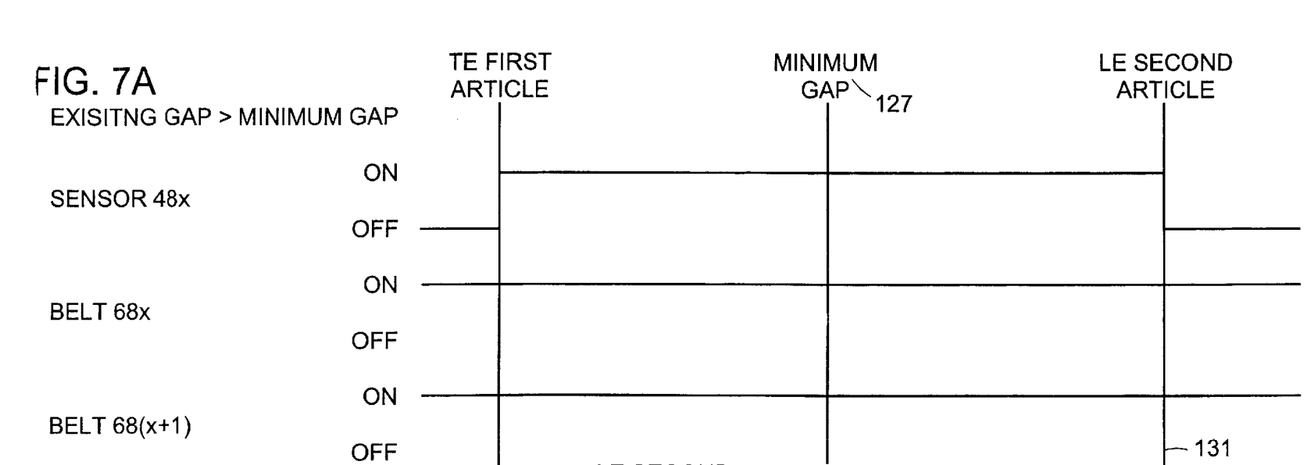
FIG. 7 is a timing diagram for the last six belts of the gapping section of the FIG. 1 embodiment.
Figure 7B:
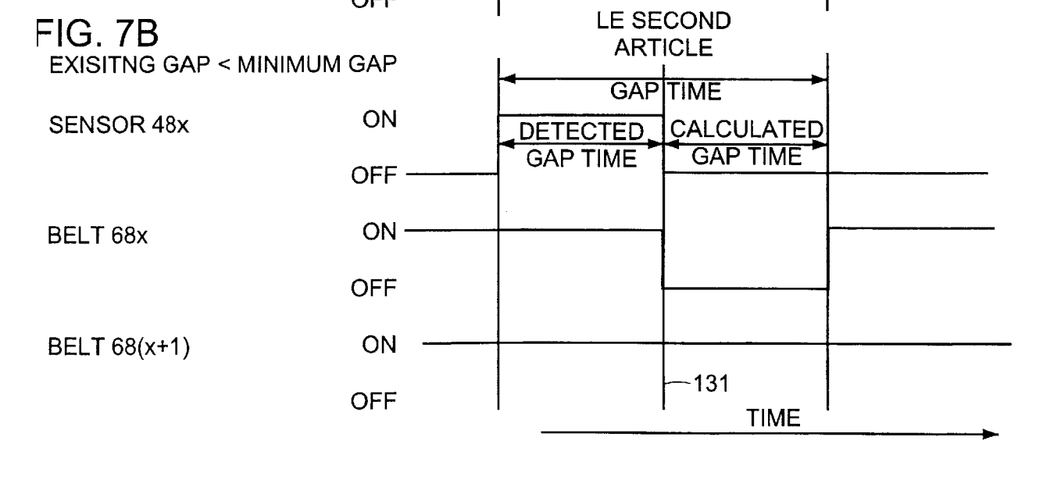

FIGS. 7a and 7b are timing diagrams that further illustrate behavior of queries 122 and 128 (FIG. 6). FIG. 7a shows how the existing trailing-edge to leading-edge gap is detected. Sensor 48x is "on" when there is no article passing, and "off" when there is an article at the end of the belt 68x (FIG. 1). If the minimum gap time 127 is shorter than detected gap time 131 and both belts 68x and 68(x+1) are on, then the query 122 returns "yes", the query 123 (FIG. 6) returns "yes" and belt 68x continues to run.

FIG. 7b illustrates behavior according to the control flow diagram of FIG. 6 when the detected gap time 131 is shorter than the minimum required gap time, as indicated by sensor 48x. In that case, a "stop" signal is sent to belt 68x in order to increase the gap. After a calculated period of time 132 (shown in FIG. 8), a "run" signal is sent to belt 68x, restarting the belt.

Figure 8:
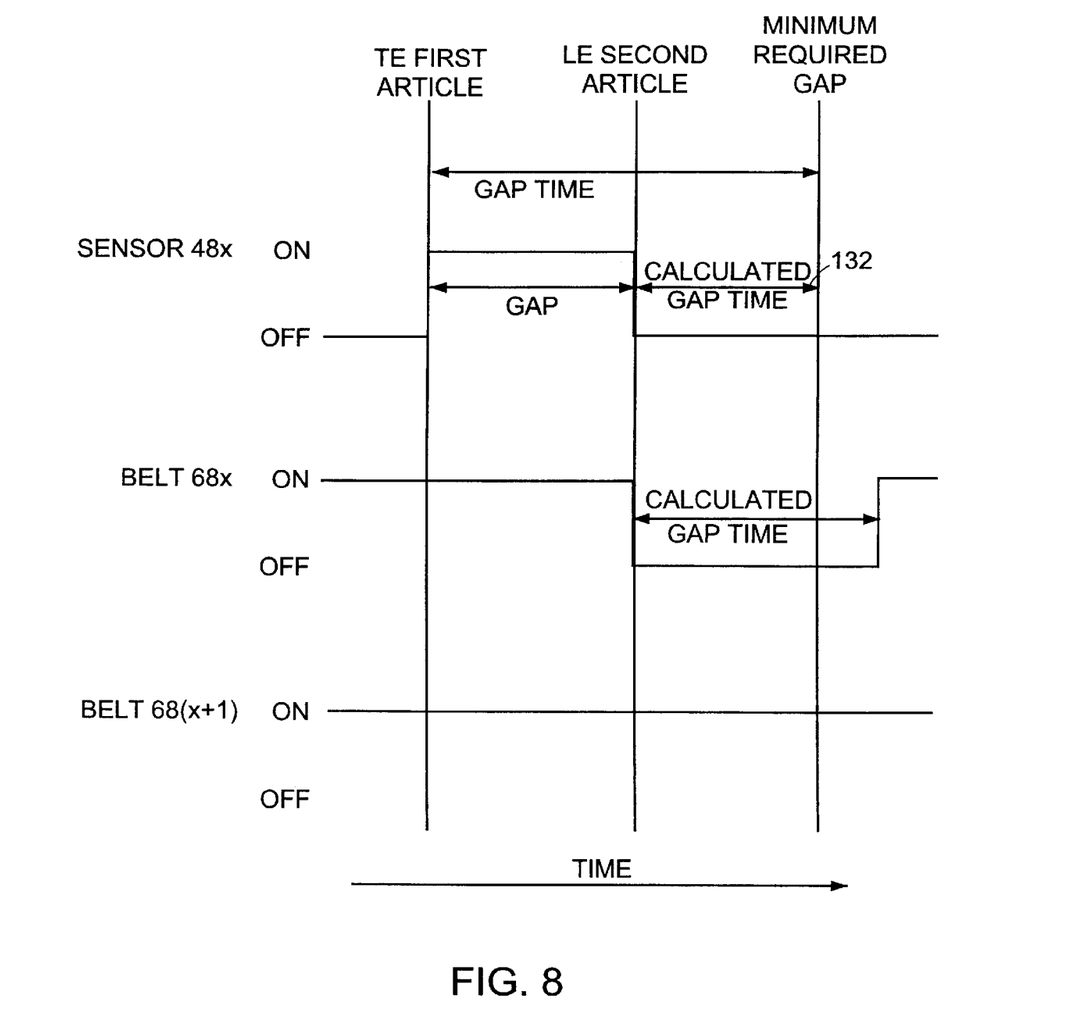
FIG. 8 is a timing diagram for all belts of the gapping section of the FIG. 1 embodiment illustrating minimum gap time logic.

When the "stop" signal is sent, belt 68x does not stop immediately—as every mechanical element, it has inertia and requires some time to slow down and stop. Since the electronics are thus faster than the mechanical parts, the stop period needs to be lengthened to take this difference into account. A timing diagram for determination of the calculated time period 132 is shown in FIG. 8. If a difference between the detected gap time and the is minimum required gap time is less than one third of the minimum required gap time, the calculated stop period is set to be one half of the minimum required gap time. This is done in order to slow down the belts enough to create at least a minimum required gap. For example, if the minimum gap between trailing and leading of successive articles is T, and the detected gap is 4T/5, the calculated stop period 132 is set to T/2. The appropriate times T are calculated based on belt speeds, application, field-testing results, etc. If the difference between the detected gap time and the minimum required gap time is equal to or greater than one third of the minimum required gap time, the calculated stop time period is set to be the difference between the detected gap time and the minimum gap time.

Figure 9:
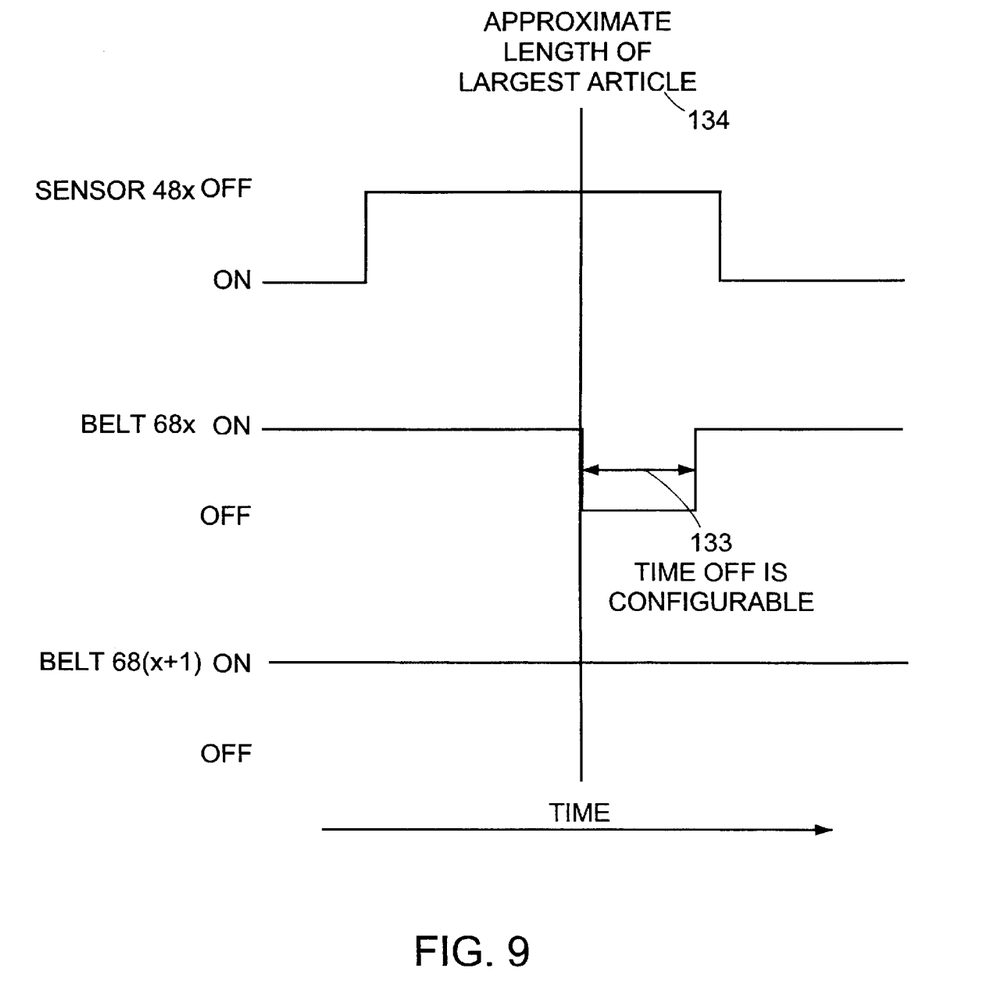
FIG. 9 is a timing diagram for two of the belts of the gapping section of the FIG. 1 embodiment illustrating clump eliminator logic.

FIG. 9 illustrates timing logic employed in a subset of belts 68x (in the illustrative embodiment this subset consists of belts 68m and 68k) that facilitates eliminating doubles that were not eliminated in the previous stages, where a double is a set of articles following so closely one after another that there is no gap to detect. In order to create gaps between the articles in the doubles, additional "clump eliminator" logic is employed. According to this timing logic, if sensor 48x is off for longer than a preset time period 134, belt 68x is turned off for a configurable time period 133 in order to allow a front article in the double to pass in order to create a gap. The preset time period 134 is generally set to equal to or less than an approximate time it would take for a largest article to pass (in the illustrative embodiment, the length of the largest possible article is known).

FIG. 10 is an illustrative timing schedule for changing the configurable time periods discussed in conjunction with FIGS. 2, 3 and 4. At any given time, all configurable time to periods are set to be equal to the values in one of the columns of FIG. 10. For example, column 140b indicates that the configurable time period 89 for the infeed chute belt 60 should be set to 1 second, a configurable time period 99 for the belt 62a should be set to 0.5 seconds, a configurable time period 107 for the belt 62b on-time should be set to 0.31 seconds, and a configurable time period 109 for the belt 62b off-time should be set to 0.57 seconds. When the throughput-monitoring subroutine indicates that the detected throughput differs from a desired throughput, the configurable time periods are adjusted by changing all values to those in an adjacent column. When the detected throughput is greater than the target throughput, a left column is picked, and when the current throughput is less than the desired throughput, a right column is picked. The configurable time periods are thus adjusted to target the desired throughput. Although in the illustrative embodiment the timing schedule of FIG. 10 is used to determine the configurable time periods, depending on application and other factors, algorithms, different timing schedules or other techniques may be utilized to calculate configurable time periods to achieve the desired throughput. In addition, configurable time periods may be adjusted based on feedback from apparatus located after the apparatus of the FIG. 1 illustrative embodiment. For example, the required minimum gap time period may be dynamically adjusted, based on selected factors both from the present apparatus and from other apparatus used with it, such as size of the articles, desired throughput, accuracy of processing at the downstream stations, etc.

Although the illustrative embodiment of the invention has been shown in the accompanying drawings and described in the Detailed Description, it will be understood that the invention is not limited to the embodiment disclosed. The number and kinds of belts employed, slide chute angles and sizes, as well as positioning of sensors and the corresponding control subroutines can each be modified. The present invention is capable of rearrangements and modifications of parts and elements by one skilled in the art without departing from the spirit and scope of the invention, which is to be defined only by the appended claims.

What is claimed is:

1. An apparatus for receiving articles in a slug and singulating the articles, comprising:
    at least first and second belts arranged such that articles received on the first belt pass to the second belt via a slide chute, thereby traversing a path defined at least in part by the first and second belts and the slide chute;
    a sensor located upstream of the slide chute that detects the presence of articles at a particular location along the path; and
    at least one controller operatively coupled to the sensor and configured to determine whether the sensor has continuously detected the presence of at least one article at the particular location for an elapsed time period that is greater than a threshold time period.

2. The apparatus of claim 1, wherein the at least one controller is further configured such that, at least under certain circumstances, the at least one controller alters an operational parameter of the first belt in response to determining that the sensor has continuously detected the presence of at least one article at the particular location for an elapsed time period that is greater than the threshold time period.

3. The apparatus of claim 2, wherein the at least one controller is further configured such that, if the first and second belts are running, the at least one controller alters the operational parameter of the first belt in response to determining that the elapsed time period has exceeded the threshold time period.

4. The apparatus of claim 2, wherein the at least one controller is further configured such that, if the first and second belts are running, the at least one controller initiates stopping of the first belt in response to determining that the elapsed time period has exceeded the threshold time period.

5. The apparatus of claim 4, wherein the at least one controller is further configured such that, if the first belt is running and the second belt is not running, the at least one controller initiates stopping of the first belt if the sensor detects the presence of at least one article at the particular location.

6. The apparatus of claim 4, wherein the at least one controller is further configured such that, if the first and second belts are not running, the at least one controller initiates starting of the first belt if the sensor does not detect the presence of at least one article at the particular location.

7. The apparatus of claim 5, wherein the at least one controller is further configured such that, if the first and second belts are not running, the at least one controller initiates starting of the first belt if the sensor does not detect the presence of at least one article at the particular location.

8. The apparatus of claim 2, wherein the at least one controller is further configured such that, if the first and second belts are running, the at least one controller initiates stopping of the first belt for a configurable time period in response to determining that the elapsed time period has exceeded the threshold time period, the at least one controller further being configured to initiate starting of the first belt after the configurable time period has elapsed.

9. The apparatus of claim 8, wherein the configurable time period is such that the first belt has not completely stopped when the at least one controller initiates starting of the first belt after the configurable time period has elapsed.

10. The apparatus of claim 8, wherein the at least one controller is further configured to adjust the configurable time period in response to a measured throughput of the apparatus.

11. The apparatus of claim 8, wherein the configurable time period is adjustable to achieve a desired apparatus throughput.

12. The apparatus of claim 8, wherein the at least one controller is further configured to adjust the configurable time period according to an adjustment schedule.

13. The apparatus of claim 8, wherein the at least one controller is further configured such that, if the first and second belts are not running, the at least one controller initiates starting of the first belt if the sensor does not detect the presence of at least one article at the particular location.

14. The apparatus of claim 13, wherein the at least one controller is further configured such that, if the first belt is running and the second belt is not running, the at least one controller initiates stopping of the first belt if the sensor detects the presence of at least one article at the particular location.

15. The apparatus of claim 8, wherein the at least one controller is further configured such that, if the first belt is running and the second belt is not running, the at least one controller initiates stopping of the first belt if the sensor detects the presence of at least one article at the particular location.

16. The apparatus of claim 2, wherein the sensor is located at an end of the fist belt.

17. The apparatus of claim 16, wherein the end is an exit end of the first belt.

18. The apparatus of claim 2, wherein the at least one controller is further configured to adjust the threshold time period in response to a measured throughput of the apparatus.

19. The apparatus of claim 2, wherein the threshold time period is adjustable to achieve a desired apparatus throughput.

20. The apparatus of claim 2, wherein the at least one controller is further configured to adjust the threshold time period according to an adjustment schedule.

21. The apparatus of claim 2, wherein the threshold time period is less than or equal to a time it would take for a longest article to travel past the sensor.

22. The apparatus of claim 1, further comprising the slide chute disposed between the first and second belts so as to form a part of the path defined by the at least first and second belts.

23. The apparatus of claim 2, further comprising the slide chute disposed between the first and second belts so as to form a part of the path defined by the at least first and second belts.

24. In an apparatus for receiving articles in a slug and singulating the articles comprising at least first and second belts arranged such that articles received on the first belt pass to the second belt via a slide chute, thereby traversing a path defined at least in part by the first and second belts and the slide chute, and a sensor located upstream of the slide chute that detects the presence of articles at a particular location along the path, a method comprising a step of:
 (a) determining whether the sensor has continuously detected the presence of at least one article at the particular location for an elapsed time period that is greater than a threshold time period.

25. The method of claim 24, further comprising a step of:
 (b) at least under certain circumstances, altering an operational parameter of the first belt in response to determining that the sensor has continuously detected the presence of at least one article at the particular location for an elapsed time period that is greater than the threshold time period.

26. The method of claim 25, wherein the step (b) includes:
 if the first and second belts are running, altering the operational parameter of the first belt in response to determining that the elapsed time period has exceeded the threshold time period.

27. The method of claim 25, wherein the step (b) includes:
 if the first and second belts are running, initiating stopping of the first belt in response to determining that the elapsed time period has exceeded the threshold time period.

28. The method of claim 27, wherein the step (b) includes:
 if the first belt is running and the second belt is not running, initiating stopping of the first belt if the sensor detects the presence of at least one article at the particular location.

29. The method of claim 27, wherein the step (b) includes:
 if the first and second belts are not running, initiating starting of the first belt if the sensor does not detect the presence of at least one article at the particular location.

30. The method of claim 28, wherein the step (b) includes:
 if the first and second belts are not running, initiating starting of the first belt if the sensor does not detect the presence of at least one article at the particular location.

31. The method of claim 25, wherein the step (b) includes:
 if the first and second belts are running, initiating stopping of the first belt for a configurable time period in response to determining that the elapsed time period has exceeded the threshold time period, and initiating starting of the first belt after the configurable time period has elapsed.

32. The method of claim 31, wherein the configurable time period is such that the first belt has not completely stopped when a signal is sent to initiate starting of the first belt after the configurable time period has elapsed.

33. The method of claim 31, further comprising a step of:
 (c) adjusting the configurable time period in response to a measured throughput of the apparatus.

34. The method of claim 31, further comprising a step of:
 (c) adjusting the configurable time period according to an adjustment schedule.

35. The method of claim 31, wherein the step (b) includes:
 if the first and second belts are not running, initiating starting of the first belt if the sensor does not detect the presence of at least one article at the particular location.

36. The method of claim 35, wherein the step (b) includes:
 if the first belt is running and the second belt is not running, initiating stopping of the first belt if the sensor detects the presence of at least one article at the particular location.

37. The method of claim 31, wherein the step (b) includes:
 if the first belt is running and the second belt is not running, initiating stopping of the first belt if the sensor detects the presence of at least one article at the particular location.

38. The method of claim 25, wherein the sensor is located at an end of the first belt.

39. The method of claim 38, wherein the end is an exit end of the first belt.

40. The method of claim 25, further comprising a step of;
 (c) adjusting the threshold time period in response to a measured throughput of the apparatus.

41. The method of claim 25, further comprising a step of:
 (c) adjusting the threshold time period to achieve a desired apparatus throughput.

42. The method of claim 25, further comprising a step of:
(c) adjusting the threshold time period according to an adjustment schedule.

43. A computer-readable medium for use with a processor included in an apparatus for receiving articles in a slug and singulating the articles, the apparatus including at least first and second belts arranged such that articles received on the first belt pass to the second belt via a slide chute, thereby traversing a path defined at least in part by the first and second belts and the slide chute, and a sensor located upstream of the slide chute that detects the presence of articles at a particular location along the path, the computer-readable medium having a plurality of instructions stored thereon, which, when executed by the processor, cause the processor to perform a step of:
(a) determining whether the sensor has continuously detected the presence of at least one article at the particular location for an elapsed time period that is greater than a threshold time period.

44. The computer-readable medium of claim 43, wherein the computer-readable medium has further instructions stored thereon, which, when executed by the processor, cause the processor to perform the further step of:
(b) at least under certain circumstances, altering an operational parameter of the first belt in response to determining that the sensor has continuously detected the presence of at least one article at the particular location for an elapsed time period that is greater than the threshold time period.

45. The computer-readable medium of claim 44, wherein the step (b) includes:
if the first and second belts are running, altering the operational parameter of the first belt in response to determining that the elapsed time period has exceeded the threshold time period.

46. The computer-readable medium of claim 44, wherein the step (b) includes:
if the first and second belts are running, initiating stopping of the first belt in response to determining that the elapsed time period has exceeded the threshold time period.

47. The computer-readable medium of claim 46, wherein the step (b) includes:
if the first belt is running and the second belt is not running, initiating stopping of the first belt if the sensor detects the presence of at least one article at the particular location.

48. The computer-readable medium of claim 46, wherein the step (b) includes:
if the first and second belts are not running, initiating starting of the first belt if the sensor does not detect the presence of at least one article at the particular location.

49. The computer-readable medium of claim 47, wherein the step (b) includes:
if the first and second belts are not running, initiating starting of the first belt if the sensor does not detect the presence of at least one article at the particular location.

50. The computer-readable medium of claim 44, wherein the step (b) includes:
if the first and second belts are running, initiating stopping of the first belt for a configurable time period in response to determining that the elapsed time period has exceeded the threshold time period, and initiating starting of the first belt after the configurable time period has elapsed.

51. The computer-readable medium of claim 50, wherein the configurable time period is such that the first belt has not completely stopped when a signal is sent to initiate starting of the first belt after the configurable time period has elapsed.

52. The computer-readable medium of claim 50, wherein the computer-readable medium has further instructions stored thereon, which, when executed by the processor, cause the processor to perform the further step of:
(c) adjusting the configurable time period in response to a measured throughput of the apparatus.

53. The computer-readable medium of claim 50, wherein the computer-readable medium has further instructions stored thereon, which, when executed by the processor, cause the processor to perform the further step of:
(c) adjusting the configurable time period according to an adjustment schedule.

54. The computer-readable medium of claim 53, wherein the step (b) includes:
if the first and second belts are not running, initiating starting of the first belt if the sensor does not detect the presence of at least one article at the particular location.

55. The computer-readable medium of claim 54, wherein the step (b) includes:
if the first belt is running and the second belt is not running, initiating stopping of the first belt if the sensor detects the presence of at least one article at the particular location.

56. The computer-readable medium of claim 50, wherein the step (b) includes:
if the first belt is running and the second belt is not running, initiating stopping of the first belt if the sensor detects the presence of at least one article at the particular location.

57. The computer-readable medium of claim 44, wherein the computer-readable medium has further instructions stored thereon, which, when executed by the processor, cause the processor to perform the further step of:
(c) adjusting the threshold time period in response to a measured throughput of the apparatus.

58. The computer-readable medium of claim 44, wherein the computer-readable medium has further instructions stored thereon, which, when executed by the processor, cause the processor to perform the further step of:
(c) adjusting the threshold time period to achieve a desired apparatus throughput.

59. The computer-readable medium of claim 44, wherein the computer-readable medium has further instructions stored thereon, which, when executed by the processor, cause the processor to perform the further step of:
(c) adjusting the threshold time period according to an adjustment schedule.

* * * * *

UNITED STATES PATENT AND TRADEMARK OFFICE
CERTIFICATE OF CORRECTION

PATENT NO. : 6,662,929 B1
DATED : December 16, 2003
INVENTOR(S) : Neary et al.

It is certified that error appears in the above-identified patent and that said Letters Patent is hereby corrected as shown below:

Title page,
Item [73], should read as follows:
-- [73]  Assignee:  Lockheed Martin Corporation,
              Bethesda, MD (US) --

Signed and Sealed this

Sixteenth Day of March, 2004

JON W. DUDAS
*Acting Director of the United States Patent and Trademark Office*